United States Patent [19]
Torii et al.

[11] Patent Number: 5,341,078
[45] Date of Patent: Aug. 23, 1994

[54] SLIDING MODE CONTROL METHOD FOR A MACHINE HAVING AN OPERATING SECTION OPERATIVELY COUPLED TO A SERVOMOTOR AND WHEREIN A SWITCHING VARIABLE IS DETERMINED BASED ON A TORSION AMOUNT AND A TORSION SPEED

[75] Inventors: Nobutoshi Torii, Hachioji; Ryo Nihei; Tetsukai Kato, both of Oshino, all of Japan

[73] Assignee: Fanuc Ltd., Yamanashi, Japan

[21] Appl. No.: 110,212

[22] Filed: Aug. 23, 1993

Related U.S. Application Data

[63] Continuation of Ser. No. 687,902, filed as PCT/JP90/01187, Sep. 17, 1990, abandoned.

[30] Foreign Application Priority Data

Sep. 30, 1989 [JP] Japan .................... 1-253767

[51] Int. Cl.$^5$ .......................... G05B 19/405
[52] U.S. Cl. ...................... 319/568.22; 318/610; 318/611; 901/9; 901/20; 901/24
[58] Field of Search .............. 318/566, 568.22, 610, 318/611; 364/164, 165; 901/9, 20, 24

[56] References Cited

U.S. PATENT DOCUMENTS

| | | | |
|---|---|---|---|
| 3,988,653 | 10/1976 | Clurman | 318/702 |
| 4,275,439 | 6/1981 | Kuwata | 318/610 X |
| 4,341,986 | 7/1982 | Browder | 318/561 X |
| 4,713,596 | 12/1987 | Bose | 318/561 X |
| 4,761,595 | 8/1988 | Goor | 364/165 X |
| 4,826,392 | 5/1989 | Hayati | 318/625 X |

FOREIGN PATENT DOCUMENTS 63301303 3/1989 Japan .

OTHER PUBLICATIONS

"Microprocessor-based force control for manipulator using variable structure with sliding mode" Dote et al. Third IFAC Symposium Sep. 1983, pp. 145-149.
Dote et al., "Digital Signal Processor (DSP)-Based Novel Variable Structure Control for Robot Manipulator", *IECON '87 Proceedings*, pp. 175-179, Nov., vol. 1, 1987.
Yeung et al., "A New Controller Design for Manipulators Using the Theory of Variable Structure Systems", *IEEE Transactions on Automatic Control*, pp. 200-206, Feb., No. 2, 1988.
Nishimoto et al., "An Integrated controlled-Current PWM Rectifier Chopper Link for Sliding Mode Position Control", *IEEE Transactions on Industry Applications*, pp. 894-900, Sep./Oct., vol. 13, 1987.

*Primary Examiner*—William M. Shoop, Jr.
*Assistant Examiner*—Brian Sircus
*Attorney, Agent, or Firm*—Staas & Halsey

[57] ABSTRACT

A sliding mode control method is provided capable of improving the following ability of a control system with respect to a command at the time of change in the operating condition of a machine, and preventing vibration which tends to occur by the action of a spring element of the machine at the time of change in the operating condition. The processor of a servo circuit derives position deviation ($\epsilon$) and speed deviation ($\dot{\epsilon}$) based on a command position ($\theta r$) and an actual position ($\theta$), estimates an torsion amount ($\epsilon n$) and torsion speed ($\dot{\epsilon}n$) by effecting observer processing (Steps 100 to 101), and derives a switching variable (s) (102). The processor derives each of the first to fourth terms of the switching input in dependence on the positive or negative sign of the switching variable, and the positive or negative sign of a corresponding one of the position deviation, the second derivative of the command position, the torsion amount, and the torsion speed (103 to 129), and then derives, on the basis of the switching input derived by adding the four terms together, a torque command (T) sufficient to cause the switching variable to converge on 0 (130, 131). The servo system properly follows the command even when nonlinear parameters associated with the spring element of the machine have varied, thereby preventing vibration of the machine.

4 Claims, 6 Drawing Sheets

SLIDING MODE CONTROL METHOD FOR A MACHINE HAVING AN OPERATING SECTION OPERATIVELY COUPLED TO A SERVOMOTOR AND WHEREIN A SWITCHING VARIABLE IS DETERMINED BASED ON A TORSION AMOUNT AND A TORSION SPEED

This application is a continuation of U.S. patent application Ser. No. 07/687,902, filed as PCT/JP90/01187, Sep. 17, 1990, now abandoned.

BACKGROUND OF THE INVENTION

1. Field of the Invention

The present invention relates to a sliding mode control method capable of preventing vibration of a machine which tends to occur by an action of a spring element of the machine when the operating condition of the machine changes.

2. Background of the Related Art

It is known to effect the feedforward compensating operation of correcting in advance the control output by considering variation in various factors, caused by variation in the machine operating condition and acting as disturbance for the control operation, so as to prevent deterioration in the controllability of a control system which would be otherwise caused when the machine operating condition has largely varied. For example, in a control system for use with a machine which includes a speed reducer disposed between a driving source and a machine operating section and acting as a spring element and a damper element, the viscous friction coefficient and spring coefficient of the speed reducer which nonlinearly vary with variation in the position and speed of the mechanical operating section are determined, and the feedforward compensating operation for acceleration is effected on the basis of the thus determined coefficients. However, according to the conventional method mentioned above, the control performance of the control system is lowered and hence vibration occurs in the machine operating section, if the viscous friction coefficient and spring coefficient cannot be precisely determined. Namely, it is difficult to provide a robust control system.

DISCLOSURE OF THE INVENTION

An object of the present invention is to provide a sliding mode control method capable of improving the following ability of a control system with respect to a command at the time of change of the machine operating condition, to thereby prevent vibration of the machine which tends to occur by the action of the spring element of the machine at the time of change of the operating condition.

In order to attain the above object, according to the present invention, there is provided a sliding mode control method applied to a machine having an operating section operatively coupled to a servomotor. This method comprises the steps of: (a) detecting the torsion amount and torsion speed of a machine operating section with respect to the rotational position and speed of a servomotor; (b) determining a switching variable in the sliding mode control based on the torsion amount and torsion speed; and (c) controlling the servomotor by deriving a control output causing the switching variable to converge.

As described above, according to the present invention, since the switching variable in the sliding mode control is determined based on the torsion amount and torsion speed of the machine operating section with respect to the rotational position and speed of the servomotor; and the control output which causes the switching variable to converge is derived, the following ability of the control system with respect to a command at the time of change of the machine operating condition can be improved, and hence vibration of the machine which may be caused by the action of the spring element of the machine can be prevented. Thus, a robust servo system which is excellent in the controllability at the time of change of the machine operating condition can be provided.

DESCRIPTION OF THE PREFERRED EMBODIMENT

Figure 3:
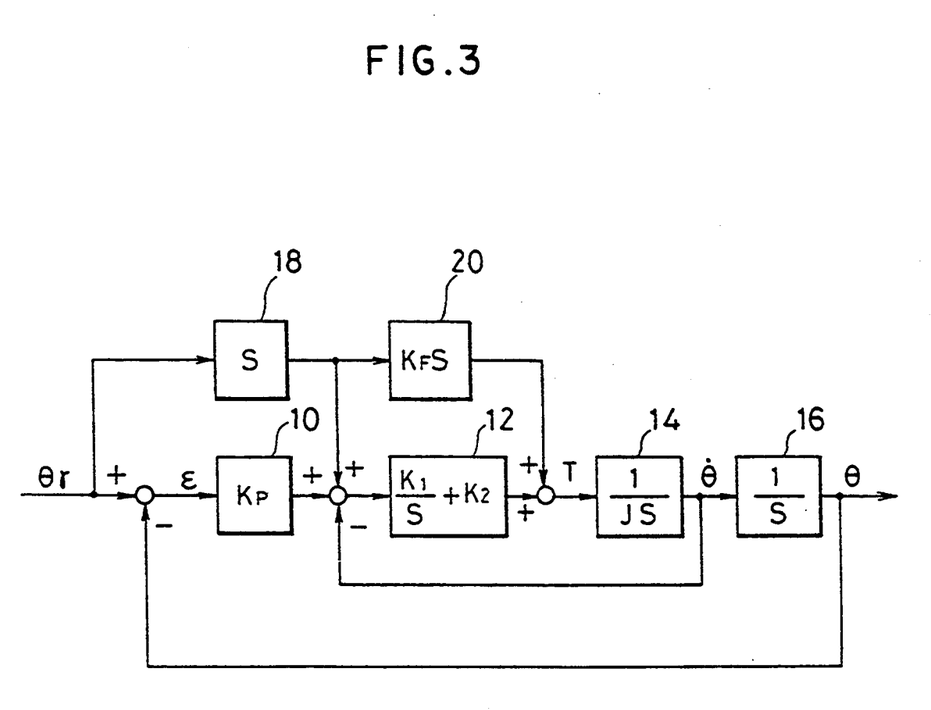
FIG. 3 is a block diagram showing, by way of example, a conventional servo system having a feedforward compensating function.
Figure 4A:
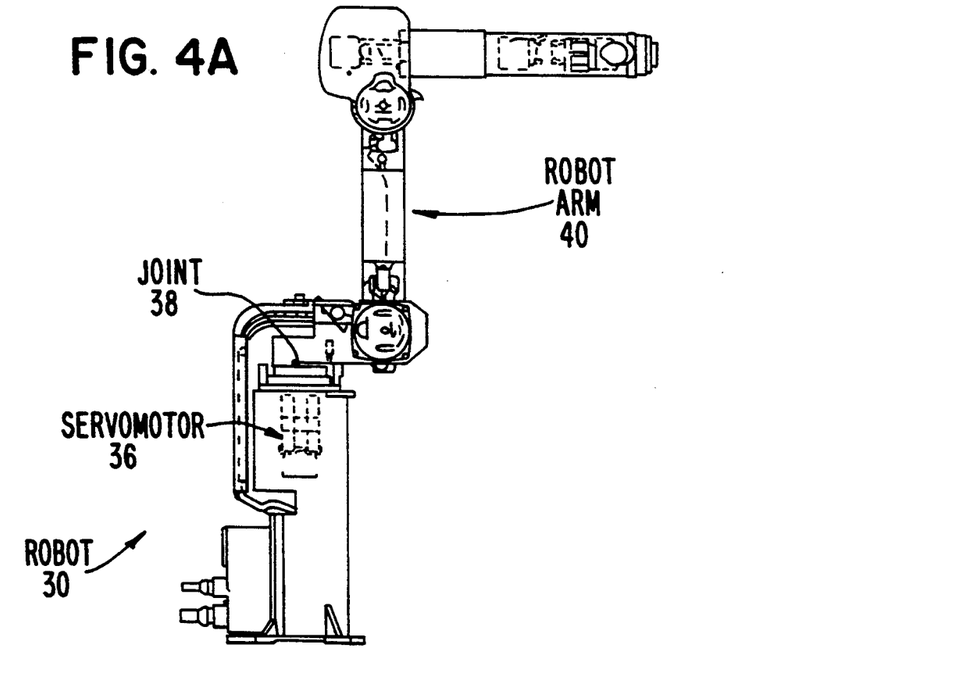
FIGS. 4A–4C illustrate a Robot for use with the sliding control process of the present invention.
Figure 4B:
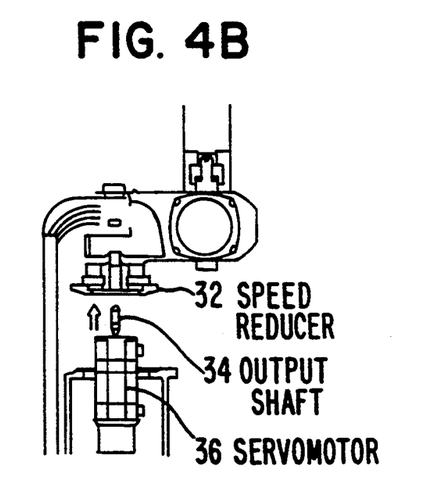
Figure 4C:
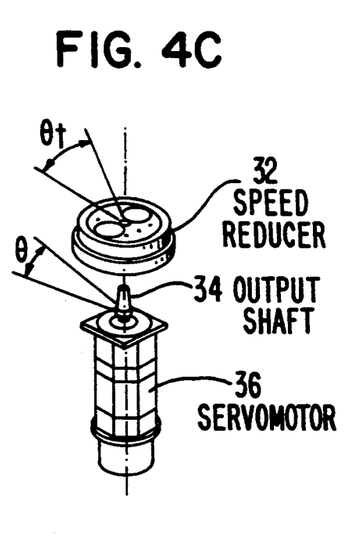

Referring to FIG. 3, the conventional servo system is used for control of a machine including a spring element and a damper element disposed between a driving source and a machine operating section, for example, for control of a robot 30 including a speed reducer 32 which couples an output shaft 34 of a servomotor 36 to a rotation shaft of one joint 38 on the side close to the distal end of a robot arm, 40 and which functions as a spring element and a damper element as shown in FIGS. 4A–4C.

The servo system of FIG. 3 includes a first transfer element 10 associated with a position loop for effecting the proportional control. In this transfer element, a difference (position deviation) $\epsilon$ between an output of a fourth transfer element 16, indicative of an actual position $\theta$, and a command position $\theta r$ is multiplied by a proportional gain Kp, whereby a command speed is derived. The command position $\theta r$ is differentiated in the first feedforward term 18 whose output is added to a difference (speed deviation) between the command speed and an actual speed $\dot{\theta}$, whereby feedforward compensation for speed is performed.

In a second transfer element 12 associated with a velocity loop for executing proportional-plus-integral control, a proportional-plus-integral control operation for the sum of the speed deviation and the first feedforward term output is effected with the use of an integration gain of K1 and a proportional gain of K2. Further, in a second feedforward term 20, the output of the first feedforward term 18 is differentiated with the use of a differentiation gain of KF. The gain KF is determined in dependence on the inertia J of a servomotor represented by a third transfer element 14, the spring coefficient of the spring element, and the viscosity coefficient of the damper. An output of the second feedforward term 20 is added to an output of a second transfer element 12, whereby a torque command T is derived. Namely, feedforward compensation for acceleration is executed. Then, a driving current corresponding to the torque command T is supplied to the servomotor, so that the motor rotates at a speed $\dot{\theta}$. The motor speed $\dot{\theta}$ is integrated in the fourth transfer element 16, so as to be converted into a motor position $\theta$.

The spring coefficient and viscosity coefficient non-linearly vary with variations in position and orientation of the machine operating section, and hence it is difficult to properly or precisely determine these coefficients. On the other hand, if unsuitable spring coefficient and viscosity coefficient are used, the above-mentioned feedforward compensation for acceleration effected on an on-line basis with the use of the linear control technique becomes improper. In this case, the following ability of the servo system with respect to the position command $\theta r$ at the time of change of the machine operating condition is lowered, thereby causing vibration to occur in the machine.

In the following, the sliding mode control method according to one embodiment of the present invention will be explained.

The control method of this embodiment is applied to a combination of a servo system and a robot which are respectively similar to the servo system and the robot explained with reference to FIG. 3, and the servo system has functions of feedforward compensation for velocity and acceleration. In the servo system, equation (1) is fulfilled from the torque balancing requirement established between the input and output sides of the servomotor, and equations (2) to (4) are fulfilled between the position deviation $\epsilon$ and the command position $\theta r$ and actual position $\theta$.

$$J \cdot \ddot{\theta} = T \quad (1)$$

$$\epsilon = \theta r - \theta \quad (2)$$

$$\dot{\epsilon} = \dot{\theta} r - \dot{\theta} \quad (3)$$

$$\ddot{\epsilon} = \ddot{\theta} r - \ddot{\theta} \quad (4)$$

where $\dot{\theta}$, $\dot{\theta} r$ and $\dot{\epsilon}$ and $\ddot{\theta}$, $\ddot{\theta} r$ and $\ddot{\epsilon}$ respectively indicate the first and second derivatives of $\theta$, $\theta r$ and $\epsilon$.

Assuming that the switching variable s and torque command T in the sliding mode control are expressed by equations (5) and (6), respectively, then the Lyapunov function V ($\geq 0$) expressed by equation (7) converges to 0 when the differentiation $\dot{V}$ thereof is negative. In other words, the characteristic of the servo system is converged on the switching plane (s=0).

$$s = \dot{\epsilon} + C \cdot \epsilon + D \cdot \int (\dot{\epsilon} + C \cdot \epsilon) - K \cdot \epsilon n \quad (5)$$

$$T = J0 \cdot \omega c \cdot \dot{\epsilon} + C \cdot J0 \cdot \omega c \cdot \epsilon + T1 \quad (6)$$

$$V = (\tfrac{1}{2}) \cdot s^2 \quad (7)$$

where $\epsilon n$ indicates a torsion amount of the distal end of the machine operating section with respect to the rotational position $\theta$ of the servomotor (Thus, $\dot{\epsilon} n$ in the following equation (8) indicates a torsion speed of the distal end of the operating section with respect to the motor speed). The torsion amount $\epsilon n$ is expressed by, e.g., a value ($\theta - \theta t$) obtained by subtracting that rotational position $\theta t$ of the speed reducer 32 on the output side of the speed reducer 32 which is so converted as to correspond to that on the input side of the speed reducer 32 from the rotational position of the speed reducer on the input side thereof, i.e., the motor rotational position $\theta$ as shown in FIG. 4C. K indicates a feedback gain, which contributes to suppression of the mechanical vibration as will be described later. Further, C indicates the time constant associated with the position deviation $\epsilon$ and speed deviation $\dot{\epsilon}$, and D indicates the time constant associated with the integration element in the third term of equation (5). $\omega c$, J0, and T1 respectively indicate time constant, predicted minimum inertia of a controlled object, and switching input (nonlinear input) mentioned later.

In the following, to simplify the explanation, equation (5') obtained by setting D to 0 in equation (5) will be used.

$$s = \dot{\epsilon} + C \cdot \epsilon - K \cdot \epsilon n \quad (5')$$

The following equation (10) can be obtained by substituting equation (9), derived from equations (1), (4) and (6), into an equation (8) obtained by differentiating both sides of equation (5').

$$\dot{s} = \ddot{\epsilon} + C \cdot \dot{\epsilon} - K \cdot \dot{\epsilon} n \quad (8)$$

$$\ddot{\epsilon} = \ddot{\theta} r - (J0/J) \cdot \omega c \cdot \dot{\epsilon} - C \cdot (J0/J) \cdot \omega c \cdot \epsilon - T1/J \quad (9)$$

$$\dot{s} = (C - \omega c \cdot J0/J) \cdot \dot{\epsilon} - (C \cdot \omega c \cdot J0/J) \cdot \epsilon - K \cdot \dot{\epsilon} n - T1/J + \ddot{\theta} r \quad (10)$$

The following equation (13) expressing the differentiation $\dot{V}$ of the Lyapunov function can be obtained by substituting equation (12), derived from equations (5') and (10), into an equation (11) obtained by differentiating both sides of equation (7).

$$\dot{V} = s \cdot \dot{s} \quad (11)$$

$$\dot{s} = (C - \omega c \cdot J0/J) \cdot s - C^2 \cdot \epsilon + \\ (C - \omega c \cdot J0/J) \cdot K \cdot \epsilon n - \\ K \dot{\epsilon} n - T1/J + \ddot{\theta} r \quad (12)$$

$$\dot{V} = (C - \omega c \cdot J0/J) \cdot s^2 - \\ [C^2 \cdot \epsilon - (C - \omega c \cdot J0/J) \cdot K \cdot \epsilon n + \\ K \cdot \dot{\epsilon} n + (T1/J) - \ddot{\theta} r] \cdot s \quad (13)$$

Next, the condition satisfying that $\dot{V} < 0$ is determined.

If the constant $\omega c$ is so determined as to satisfy the following equation (14), the first term on the right side of equation (13) becomes negative, as shown in equation (15). In equation (14), a symbol Jmax indicates a predicted maximum inertia which varies in dependence on the operating condition.

$$\omega c = C \cdot Jmax/J0 \quad (14)$$

First term of right side of equation (13) $= C \cdot (1 - Jmax/J) \cdot s^2 < 0 \quad (15)$ In this case, when the second term of equation (13) is negative as shown in equation (16), the condition that $\dot{V} < 0$ can be attained.

$$-[C^2 \cdot \epsilon - (C - \omega c \cdot J0/J) \cdot K \cdot \epsilon n + K \cdot \dot{\epsilon} n + (T1/J) - \ddot{\theta} r] \cdot s < 0 \quad (16)$$

Thus, in order to make the sliding mode control characteristic adaptive to variations in system parameters resulting from the convergence of the switching variable of the servomotor control system forming the switching plane (s=0) in the sliding mode control, it is sufficient to control the servomotor by the use of a torque command T corresponding to the switching input T1 which satisfies equation (16).

In this embodiment, when the switching input T1 which satisfies the condition that $\dot{V}<0$ is determined, the switching input T1 is divided into a first term $K1(\epsilon)$ expressed as a function of position deviation $\epsilon$, a second term $K2(\ddot{\theta}r)$ expressed as a function of a second derivative $\ddot{\theta}r$ of the command position and associated with the feedforward compensation for acceleration, and third and fourth terms $K(\epsilon n)$ and $K(\dot{\epsilon}n)$ each expressed as a function of a corresponding one of the torsion amount $\epsilon n$ and torsion speed $\dot{\epsilon}n$, as shown in equation (17).

$$T1 = K1(\epsilon) + K2(\ddot{\theta}r) + K3(\epsilon n) + K4(\dot{\epsilon}n) \quad (17)$$

Then, each of the first term $K1(\epsilon)$, second term $K2(\ddot{\theta}r)$, third term $K3(\epsilon n)$ and fourth term $K4(\dot{\epsilon}n)$ is derived in accordance with a corresponding calculation equation which is determined in dependence on the sign of the switching variable s and the sign of a corresponding position deviation $\epsilon$, second derivative $\ddot{\theta}r$ of command position, torsion amount $\epsilon n$, and torsion speed $\dot{\epsilon}n$.

More specifically, equation (16) is fulfilled when $s \geq 0$ and if equation (18) is satisfied. Equation (16) is also fulfilled, when $s<0$ and if expression (19) is satisfied.

$$T1 > -C^2 \cdot J \cdot \epsilon - J \cdot \ddot{\theta}r + (C - J0 \cdot \omega c/J) \cdot J \cdot K \cdot \epsilon n - J \cdot K \cdot \dot{\epsilon}n \quad (18)$$

$$T1 < -C^2 \cdot J \cdot \epsilon - J \cdot \ddot{\theta}r + (C - J0 \cdot \omega c/J) \cdot J \cdot K \cdot \epsilon n - J \cdot K \cdot \dot{\epsilon}n \quad (19)$$

Therefore, the first term $K1(\epsilon)$ of the switching amount T1 is derived by using equation (20) when $s \geq 0$ and $\epsilon \geq 0$ or when $s<0$ and $\epsilon<0$ and by using equation (21) when $s \geq 0$ and $\epsilon<0$ or when $s<0$ and $\epsilon \geq 0$.

$$K1(\epsilon) = -C^2 \cdot J0 \cdot \epsilon \quad (20)$$

$$K1(\epsilon) = -C^2 \cdot J\max \cdot \epsilon \quad (21)$$

The second term $K2(\ddot{\theta}r)$ of the switching input T1 is derived by using equation (22) when $s \geq 0$ and $\ddot{\theta}r \geq 0$ or when $s<0$ and $\ddot{\theta}r<0$, and by using equation (23) when $s \geq 0$ and $\ddot{\theta}r<0$ or when $s<0$ and $\ddot{\theta}r \geq 0$.

$$K2(\ddot{\theta}r) = J\max \cdot \ddot{\theta}r \quad (22)$$

$$K2(\ddot{\theta}r) = J0 \cdot \ddot{\theta}r \quad (23)$$

The third term $K3(\epsilon n)$ of the switching input T1 is derived by using equation (24) when $s \geq 0$ and $\epsilon n \geq 0$ or when $s<0$ and $\epsilon n<0$, and by using equation (25) when $s \geq 0$ and $\epsilon n<0$ or when $s<0$ and $\epsilon n \geq 0$.

$$K3(\epsilon n) = 0 \quad (24)$$

$$K3(\epsilon n) = (J0 - J\max) \cdot C \cdot K \cdot \epsilon n \quad (25)$$

The fourth term $K4(\dot{\epsilon}n)$ of the switching input T1 is derived by using equation (26) when $s \geq 0$ and $\dot{\epsilon}n \geq 0$ or when $s<0$ and $\dot{\epsilon}n<0$, and by using equation (27) when $s \geq 0$ and $\dot{\epsilon}n<0$ or when $s<0$ and $\dot{\epsilon}n \geq 0$.

$$K4(\dot{\epsilon}n) = -J0 \cdot K \cdot \dot{\epsilon}n \quad (26)$$

$$K4(\dot{\epsilon}n) = -J\max \cdot K \cdot \dot{\epsilon}n \quad (27)$$

Further, the switching amount T1 for satisfying that $\dot{V}<0$ is determined by adding the first to fourth terms $K1(\epsilon)$ to $K4(\dot{\epsilon}n)$ derived as described above, and a torque command T, which is sufficient to make the servo system characteristic adaptive to variations in system parameters including a nonlinear parameter, is calculated by the use of the derived switching amount T1 and in accordance with equation (6). Then, the motor is driven in accordance with the thus derived torque command T. In this case, the Lyapunov's stabilizing condition ($\dot{V}<0$) is satisfied, whereby the servo system characteristic converges on the switching surface (s=0). In other words, the response characteristic of the servo system is determined in dependence on the switching variable, so that the control stability of the system can be maintained.

Next, the reason why the vibration suppressing effect of suppressing vibration in the machine including the spring element can be obtained by the switching variable s converging toward "0" as described above will be explained.

When the switching variable converges to "0", equation (29) is fulfilled in light of equation (5').

$$0 = \dot{\epsilon} + C \cdot \epsilon - K \cdot \epsilon n \quad (29)$$

By substituting the second to fourth equations (2) to (4) into the equation (29), and subjecting the same to the Laplace transform, we obtain $$(S+C) \cdot \theta r = (S+C+K) \cdot \theta - K \cdot \theta t \quad (30)$$

where a symbol S denotes a Laplacean complex variable.

The transfer function of the position $\theta t$ of the distal end of the machine operating section with respect to the rotational position $\theta$ of the input side of the speed reducer functioning as the damper element and spring element of the machine is expressed by equation (31).

$$(\theta t)/\theta = (Bk \cdot S + Kc)/(Jt \cdot S^2 + Bk \cdot S + Kc) \quad (31)$$

where Bk and Kc respectively denote the damping term and spring coefficient of the spring system having the speed reducer as the main factor and Jt denotes the inertia of the load on the machine operating section side with respect to the speed reducer.

From equations (30) and (31), we obtain $$\frac{\theta t}{\theta r} = \frac{Bk \cdot S + Kc}{Jt \cdot S^2 + Bk \cdot S + Kc + \{K \cdot Jt \cdot S^2/(S+C)\}}. \quad (32)$$

When the time constant C of the servo system is set to a small value so that the value (S+C) in equation (32) can be regarded as being equal to a value S at the resonant frequency of the spring system, the transfer function of the position $\theta t$ of the machine operating section with respect to the position command $\theta r$ to the servomotor is expressed by equation (33). Equation (33) indicates that the feedback gain K constitutes part of a damping term of a second-order system, and contributes to suppression of the machine vibration. In other words, the vibration suppressing effect can be obtained when the sliding mode control is so effected as to converge the switching variable s to 0.

$$\frac{\theta t}{\theta r} = \frac{Bk \cdot S + Kc}{Jt \cdot S^2 + (Bk + K \cdot Jt)S + Kc} \quad (33)$$

In this embodiment, an observer for estimating the torsion amount $\epsilon n$ and torsion speed $\dot{\epsilon}n$ is employed for detection of these parameters. In the following, to determine a model which constitutes the observer, an associated state equation will be determined.

At first, kinematic equations shown in equations (34) and (35) are derived in view of torque balance on the input and output sides of the speed reducer, and equation (36) is derived from equations (34) and (35).

$$T = J\ddot{\theta} + Bk(\dot{\theta} - \dot{\theta}t) + Kc(\theta - \theta t) \tag{34}$$

$$0 = Jt\ddot{\theta}t + Bk(\dot{\theta}t - \dot{\theta}) + Kc(\theta t - \theta) \tag{35}$$

$$T/J = \ddot{\epsilon}n + (Bk/J + Bk/Jt)\dot{\epsilon}n + (Kc/J + Kc/Jt)\epsilon n \tag{36}$$

Equations (37) and (38) are derived from equations (36) and (34).

$$\ddot{\epsilon}n = -(Bk/J + Bk/Jt)\dot{\epsilon}n - (Kc/J + Kc/Jt)\epsilon n + T/J \tag{37}$$

$$\ddot{\theta} = -(Bk/J)\dot{\epsilon}n - (Kc/J)\epsilon n + T/J \tag{38}$$

Assuming that $\dot{\epsilon}_n = x1$, $\epsilon_n = x2$ and $\dot{\theta} = x2$, then equations (39) and (41) can be derived from equations (37) and (38), and equation (40) is fulfilled.

$$\dot{x}1 = -\{(Bk/J) + (Bk/Jt)\}x1 - \{(Kc/J) + (Kc/Jt)\}x2 + (T/J) \tag{39}$$

$$\dot{x}2 = x1 \tag{40}$$

$$\dot{x}3 = -(Bk/J)x1 - (Kc/J)x2 + (T/J) \tag{41}$$

From the equations (39) to (41), we obtain $$\frac{d}{dt}\begin{bmatrix} x1 \\ x2 \\ x3 \end{bmatrix} = \begin{bmatrix} 1/J \\ 0 \\ 1/J \end{bmatrix} \cdot T + \tag{42}$$

$$\begin{bmatrix} -\{(Bk/J) + (Bk/Jt)\} & -\{(Kc/J) + (Kc/Jt)\} & 0 \\ 1 & 0 & 0 \\ -Bk/J & -Kc/J & 0 \end{bmatrix} \begin{bmatrix} x1 \\ x2 \\ x3 \end{bmatrix}$$

Further, the state equation indicated by equation (43) can be obtained by simplifying equation (42).

$$dx/dt = A'x - K'D'x + K'D'x + B'T = (A' - K'D')x + K'y + B'T \tag{43}$$

where $$x = \begin{bmatrix} x1 \\ x2 \\ x3 \end{bmatrix}, y = [0, 0, 1]\begin{bmatrix} x1 \\ x2 \\ x3 \end{bmatrix},$$

A', B', and D' represent matrices, and K' represents a constant which is so selected that (A' − K'D') becomes stable.

In view of equation (33), the model constituting the observer can be expressed by equation (44).

$$d\hat{x}/dt = (A' - K'D')\hat{x} + K'y + B'T \tag{44}$$

where $$\hat{x}\left( = \begin{bmatrix} x1 \\ x2 \\ x3 \end{bmatrix} \right)$$

indicates the estimated value of x, and satisfies the following relation. That is, the torsion amount $\epsilon n$ and torsion speed $\dot{\epsilon}n$ can be estimated by means of the observer corresponding to equation (44).

$$\begin{bmatrix} \hat{x}1 \\ \hat{x}2 \\ \hat{x}3 \end{bmatrix} = \begin{bmatrix} x1 \\ x2 \\ x3 \end{bmatrix} = \begin{bmatrix} \dot{\epsilon}n \\ \epsilon n \\ \dot{\theta} \end{bmatrix}$$

Alternatively instead of the observer, first and second speed detectors may be provided on the input and output sides of the speed reducer. In this case, the torsion amount $\epsilon n$ and torsion speed $\dot{\epsilon}n$ are detected on the basis of an output indicative of the rotational position $\theta$ and speed $\dot{\theta}$ of the speed reducer on the input side of the speed reducer and supplied from the first speed detector, and an output indicative of the rotational position $\theta t$ and speed $\dot{\theta}t$ of the speed reducer on the output side of the speed reducer and supplied from the second speed detector.

Figure 1:
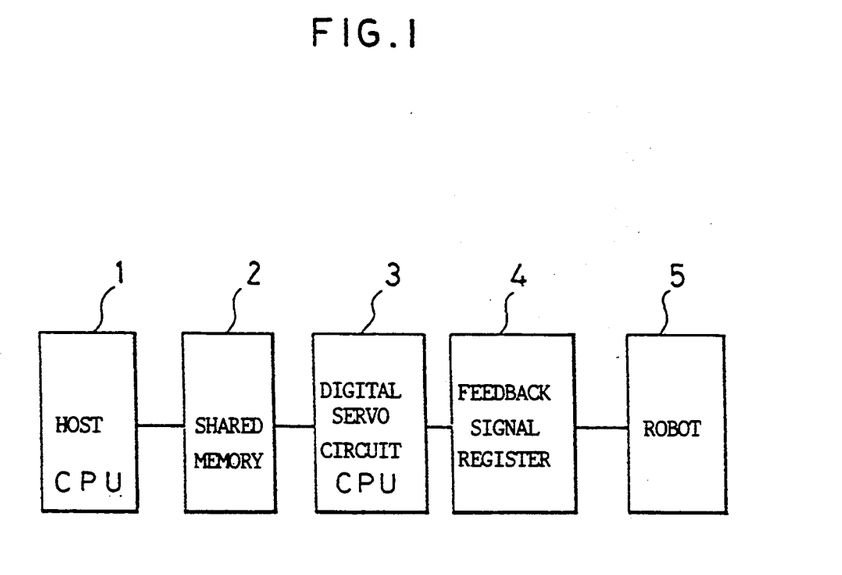
FIG. 1 is a schematic block diagram showing a servo system for effecting sliding mode control according to one embodiment of the present invention.

Next, with reference to FIG. 1, a digital servo system (software servo) for embodying the above-mentioned sliding mode control will be explained.

The servo system includes a digital servo circuit 3 which accommodates therein a digital signal processor (not shown), and a memory for storing preset values of various constants, mentioned later. The digital servo circuit 3 is designed to perform, by means of software processing, position, speed and current control of servomotors (each corresponding to the third transfer element 14 of FIG. 3), not shown, for individual axes of the robot 5.

The servo system further includes a shared memory 2, which is formed of a RAM and is arranged to be accessible from the processor (hereinafter referred to as first processor) of the digital servo circuit 3, and from a processor (hereinafter referred to as second processor), not shown, of a host computer, e.g., a numerical control device 1 for distributing a movement command, a current detector (not shown) for detecting an actual driving current flowing in the servomotor, and a servo amplifier (not shown) which responds to the current detector output and the current command supplied from the digital servo circuit 3 to drive the servomotors for the individual axes. Further, the servo system includes pulse encoders (not shown) mounted on the respective servomotors, a feedback signal register 4 for storing, under the control of the processor, the detection result obtained by the current detector and by the pulse encoders, and a manual data input device (not shown) for inputting various constants.

In the following, with reference to FIGS. 2A to 2C, the operation of the servo system of FIG. 1 will be explained.

When various constants (for example, parameters C and $\omega c$, predicted maximum inertia Jmax, predicted minimum inertia J0, and matrices A', B' and D') required for the sliding mode control and observer processing are inputted via the manual data input device prior to start of the robot operation, these constants are stored into the memory of the servo circuit 3 under the control of the first processor. Alternatively the various constants may be programmed in the robot control program, instead of executing the manual input.

Figure 2A:
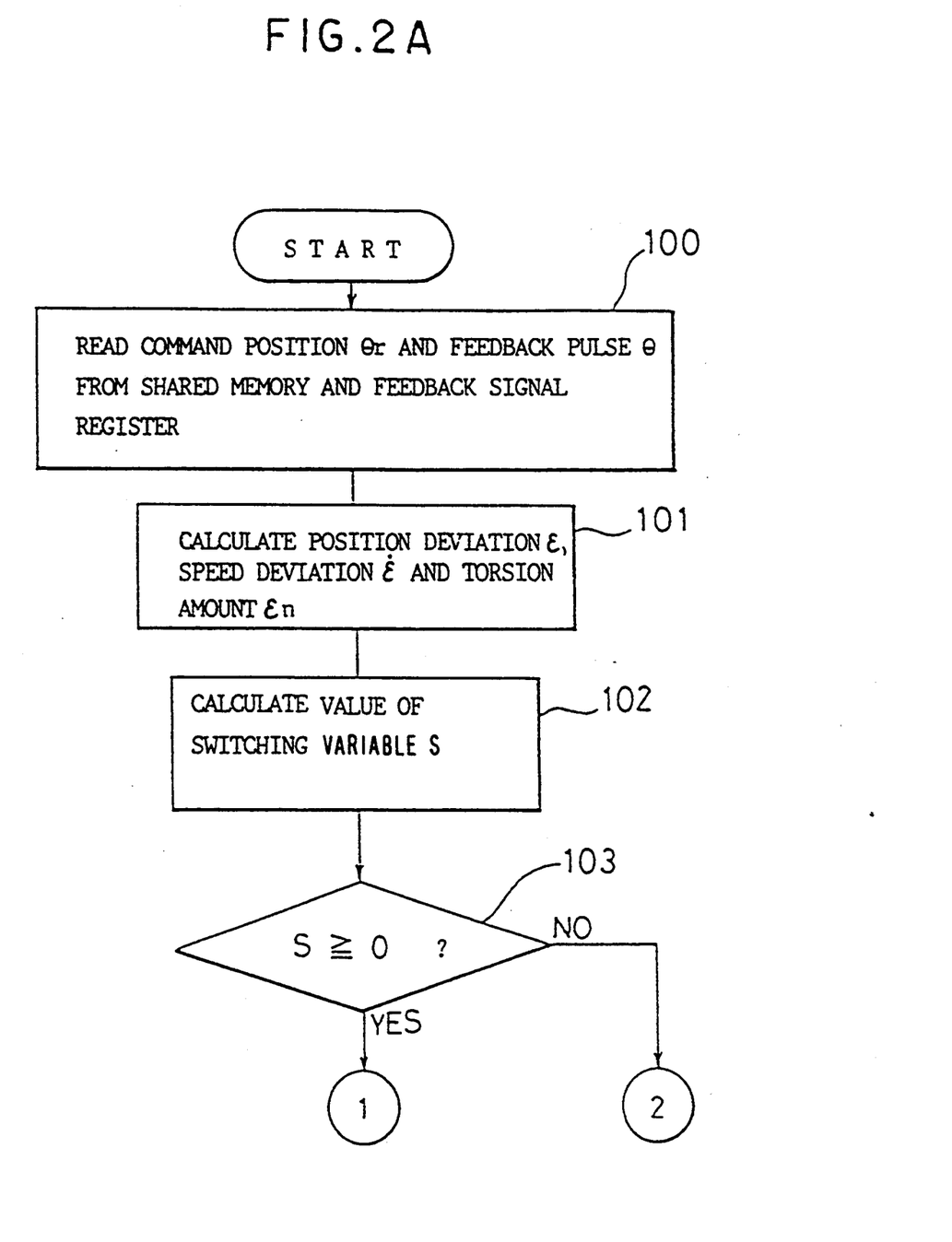
FIGS. 2A to 2C are flowcharts showing a sliding mode control process effected by a processor of the digital servo circuit of FIG. 1.
Figure 2B:
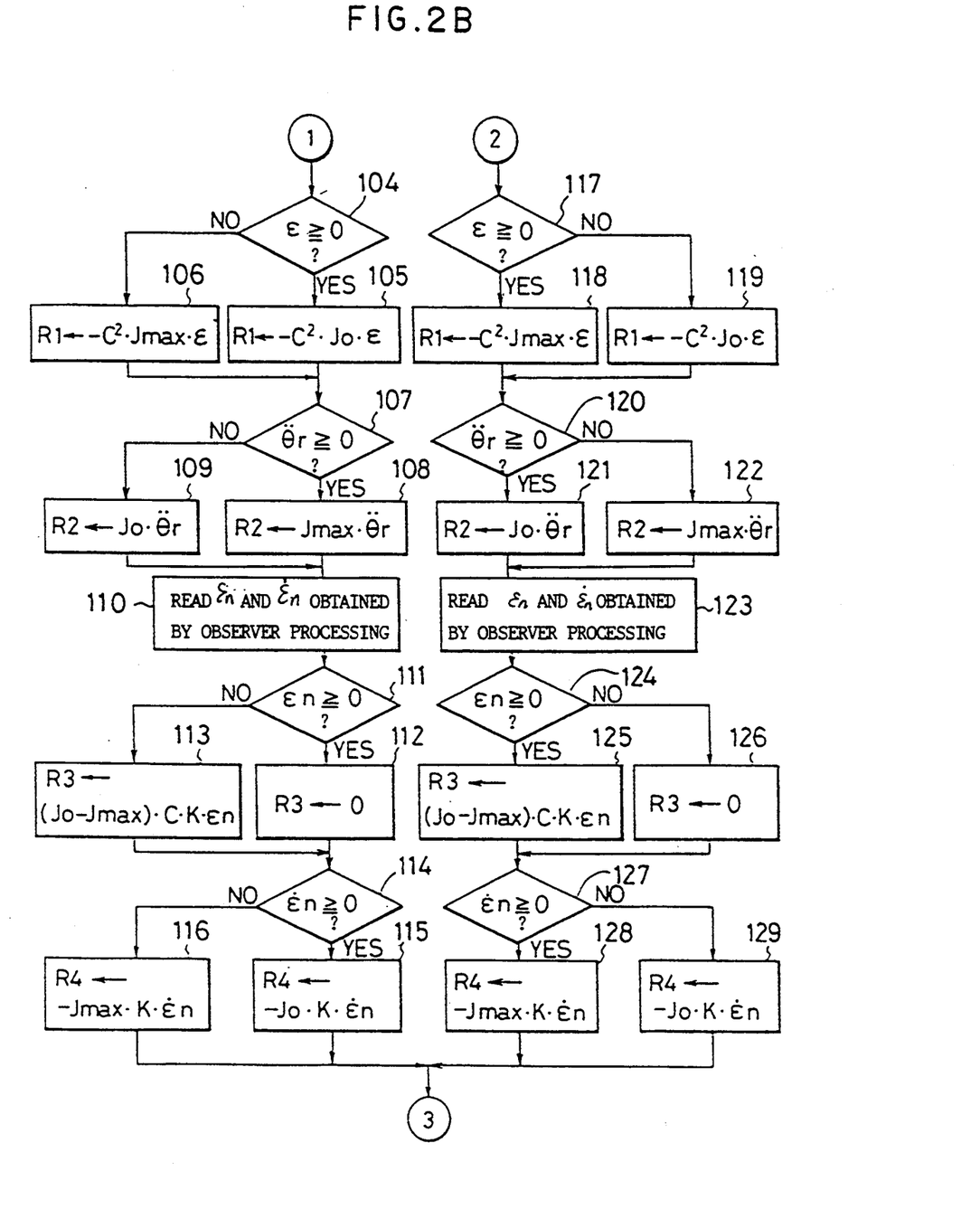
Figure 2C:
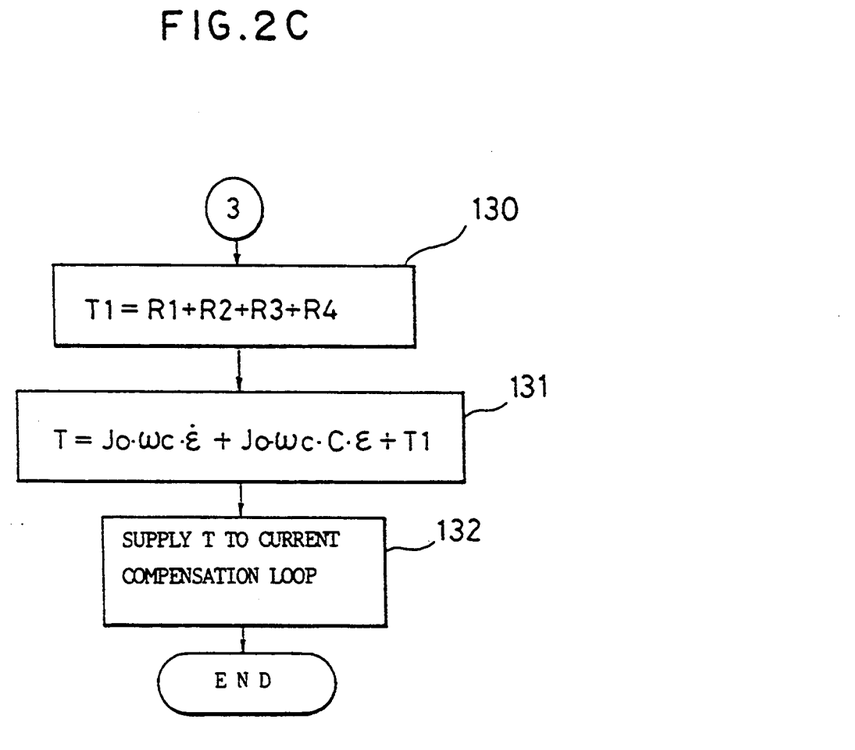

During the robot operation, the first processor executes the sliding mode control process shown in FIGS. 2A to 2C at intervals of the same period as a period at which the movement command distribution is executed by the second processor.

Namely, in each control cycle, the first processor reads out the command position $\theta r$ from the shared RAM into which the command position is written at intervals of the movement command distribution cycle by the second processor, and reads out the actual motor position $\theta$ from the feedback signal register 4 (step 100). Then, the first processor calculates a position deviation $\epsilon(=\theta r-\theta)$ and speed deviation $\dot{\epsilon}$, executes the observer processing corresponding to equation (44) to thereby derive a torsion amount $\epsilon n$ and torsion speed $\dot{\epsilon}n$, and causes registers accommodated in the first processor to store the derived values (step 101).

Next, the first processor derives a value of the switching variable s in accordance with equation (5′) (step 102), and then determines whether or not the derived value s is positive or "0" (step 103). When it is determined that $s \geq 0$, the first processor determines whether or not the position deviation $\epsilon$ is "0" or positive (step 104). If $\epsilon \geq 0$, the processor derives the first term K1 of the switching amount T1 in accordance with equation (20), and causes the register R1 provided in the first processor to store the derived value (step 105). On the other hand, if the determination result in the step 104 is negative ($\epsilon < 0$), the processor derives the value K1($\epsilon$) in accordance with equation (21), and causes the same to be stored into the register R1 (step 106).

In the step 107 following the step 105 or 106, the first processor derives the second derivative $\ddot{\theta}r$ of the command position. At this time, the first processor derives a difference between the command position $\theta r$ in the preceding processing cycle and that in the present processing cycle, as the first derivative $\dot{\theta}r$ of the command position, derives a difference between the first derivative thus obtained and the first derivative obtained in the same manner in the preceding processing cycle, as the second derivative $\ddot{\theta}r$, and then makes a determination as to whether or not the second derivative $\ddot{\theta}r$ is positive or "0". If the determination result is affirmative ($\ddot{\theta}r \geq 0$), the first processor derives a value of the second term K2($\ddot{\theta}r$) of the switching amount T1 in accordance with equation (22), and stores the same in the register R1 (step 108). If the determination result in the step 107 is negative ($\ddot{\theta}r < 0$), the processor causes the register R2 to store a value of the second term derived in accordance with equation (23) (step 109).

Next, the first processor reads out the torsion amount $\epsilon n$ and torsion speed $\dot{\epsilon}n$ from the built-in register (step 110), and determines whether or not the torsion amount $\epsilon n$ is positive or "0" (step 111). If $\epsilon n \geq 0$, the processor derives the third term K3($\epsilon n$) of the switching amount T1 in accordance with equation (24), and stores the same in the register R3 (step 112). If $\epsilon n < 0$, the processor causes the register R3 to store the value K3($\epsilon n$) derived in accordance with equation (25) (step 113). Further, a determination is made as to whether or not the torsion speed $\dot{\epsilon}n$ is positive or "0" (step 114). If $\dot{\epsilon}n \geq 0$, a value of the fourth term K4($\dot{\epsilon}n$) of the switching amount T1 derived according to the equation (26) is stored into the register R4 (step 115). On the other hand, if $\dot{\epsilon}n < 0$, a value K4($\dot{\epsilon}n$) derived according to the equation (27) is stored into the register R4 (step 116).

When the determination result in the step 103 is negative (s<0), the first processor derives a value K1($\epsilon$) in accordance with equation (20) or (21) which is selected in dependence on the result of determination, at the step 117 corresponding to the step 104, regarding the sign (positive or negative) of the position deviation $\theta$, and causes the register R1 to store the derived value (steps 118 and 119). Next, the processor causes the register R2 to store a value K2($\ddot{\theta}r$) derived in accordance with equation (22) or (23) selected in dependence on the result of determination, at the step 120, regarding the sign of the second derivative $\ddot{\theta}r$ (steps 121 and 122). Further, the processor causes the register R3 to store a value K3($\epsilon n$) derived in accordance with equation (24) or (25) which is selected according to the result of determination, at the step 124, regarding the sign of the torsion amount $\epsilon n$ read out in the step 123 (steps 125 and 126). Then, the processor causes the register R4 to store a value K4($\dot{\epsilon}n$) derived in accordance with equation (26) or (27) selected according to the result of determination in the step 127 regarding the sign of the torsion speed $\dot{\epsilon}n$ (steps 128 and 129).

At the step 130 following the step 115, 116, 128 or 129, the first processor adds together the values of the first to fourth terms of the switching amount T1 respectively read out from the registers R1 to R4, to thereby derive the switching amount T1, and derives the torque command T in accordance with equation (6) (step 131). Then, the processor supplies the current control loop with the derived torque command T (step 132). The servo amplifier operates to supply a corresponding one of the servomotors for the individual axes of the robot 5a with a driving current, which corresponds to the voltage command supplied from the digital servo circuit 3, to thereby drive the corresponding servomotor. For the reason described above, a proper operation amount (torque command T) can be obtained even if the nonlinear system parameters have significantly varied during the robot operation. As a result, the locus precision of the robot can be improved, vibration of the robot caused in the robot operation at a stationary speed can be suppressed, and residual vibration at the time of interruption of the robot operation can be reduced.

The many features and advantages of the invention are apparent from the detailed specification and thus is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A sliding mode control method applied to a machine having an operating section operatively coupled to a servomotor, said method comprising the steps of:
   (a) detecting a torsion amount and torsion speed of the operating section with respect to a rotational position and speed of the servomotor;
   (b) determining a switching variable during sliding mode control based on the torsion amount and the torsion speed;
   (c) deriving a control output which causes the switching variable to converge toward zero; and (d) controlling the servomotor according to the control output.

2. A sliding mode control method according to claim 1, wherein said step (a) further includes estimating the torsion amount and the torsion speed using an observer which is modeled based on a state equation associated with the machine.

3. A sliding mode control method according to claim 1, wherein said method is applied to the machine which includes:

a speed reducer disposed between the servomotor and the operating section, the speed reducer being operable and generating torsion when the speed reducer rotates the operating section;

a first detector detecting and generating a first output representative of a rotational position and speed of the speed reducer on an input side of the speed reducer; and a second detector detecting and generating a second output representative of the rotational position and the speed of the speed reducer on an output side of the speed reducer, and wherein said step (a) further includes detecting the torsion amount and the torsion speed based on the first and second outputs.

4. A sliding mode control method according to claim 1, wherein said switching variable is expressed by the following equation (A):

$$s = \dot{\epsilon} + C \cdot \epsilon - K \cdot \epsilon n, \tag{A}$$

where s denotes said switching variable, $\epsilon$ denotes a position deviation, $\dot{\epsilon}$ denotes the first derivative of $\epsilon$, $\epsilon n$ denotes the torsion amount, C denotes a time constant of a servo system, and K denotes a feedback gain, a transfer function of a rotational position $\theta t$ of the operating section with respect to a position command $\theta r$ to the servomotor is expressed by the following equation (B):

$$\frac{\theta t}{\theta r} = \frac{Bk \cdot S + Kc}{Jt \cdot S^2 + Bk \cdot S + Kc + \{K \cdot Jt \cdot S^2/(S+C)\}}, \tag{B}$$

where Bk and Kc respectively denote a damping term and a spring coefficient of a spring system, Jt denotes an inertia of a load on the operating section, and S denotes a Laplace complex variable, and said method further comprises setting said time constant C to a small value so that the value $1/(S+C)$ in the equation (B) is approximately equal to a value $1/S$ at a resonant frequency of the spring system.

* * * * *

UNITED STATES PATENT AND TRADEMARK OFFICE
CERTIFICATE OF CORRECTION

PATENT NO. : 5,341,078
DATED : August 23, 1994
INVENTOR(S) : Nobutoshi TORII et al.

It is certified that error appears in the above-indentified patent and that said Letters Patent is hereby corrected as shown below:

[57] ABSTRACT, line 10, delete "($\epsilon$n)" and insert --($\dot{\epsilon}$n)--.

Column 1, line 14, delete "1."; and line 20, delete "2.".

Column 2, line 37, delete "," after "40" insert --,--.

Column 3, line 52, after "wc·" delete "$\epsilon$" and insert --$\dot{\epsilon}$--.

Column 4, line 33, delete "s" and insert --$\dot{s}$--.

Column 5, line 12, after "speed" delete "$\epsilon$n" and insert

--$\dot{\epsilon}$n--.

Column 6, line 28, delete "Laplacean" and insert

--Laplace--.

Column 8, line 9, after "speed" delete "$\epsilon$n" and insert

--$\dot{\epsilon}$n--; and

UNITED STATES PATENT AND TRADEMARK OFFICE
CERTIFICATE OF CORRECTION

PATENT NO. : 5,341,078
DATED : August 23, 1994
INVENTOR(S) : Nobutoshi Torii et al.

It is certified that error appears in the above-indentified patent and that said Letters Patent is hereby corrected as shown below:

line 20, after "amount" delete "$\varepsilon$n" and insert --$\varepsilon$n-- and after "speed", delete "$\varepsilon$n" and insert --$\dot{\varepsilon}$n--.

Signed and Sealed this

Twenty-ninth Day of November, 1994

Attest:

BRUCE LEHMAN

*Attesting Officer*     *Commissioner of Patents and Trademarks*